Patented Sept. 14, 1943

2,329,456

UNITED STATES PATENT OFFICE 2,329,456

VINYL RESIN COATING COMPOSITION

William E. Campbell, Jr., Whittier, Calif., assignor to Carbide and Carbon Chemicals Corporation, a corporation of New York No Drawing. Application June 12, 1942, Serial No. 446,696

13 Claims. (Cl. 260—42)

Artificial vinyl resins such as can be made by the conjoint polymerization of vinyl halides with vinyl esters of aliphatic acids have already received recognition as protective coating materials.

These resins are primarily adapted for this function by their outstanding resistance to the atmospheric elements; by their inertness towards chemicals, water, and most common solvents; by their lack of color, odor, taste, or toxicity; by their strength, toughness and flexibility; by their stability towards light and heat, especially when associated with the stabilizing ingredients which have been developed for this purpose; by their ability to be applied by spraying from reasonably concentrated solutions without "cobwebbing"; and by their high finish and durability.

Despite these favorable qualities, these resins have previously possessed a defective property prejudicial to their application as coating materials for some purposes. This characteristic is the comparatively poor adhesion of the resinous coating to certain smooth surfaces, notably those of glass and metals, unless the protective film is baked. To be effective, the baking operation must be done at relatively high temperatures of around 350° F., and higher, and for a period of about 30 minutes. Such severe heat treatment necessitates the inclusion of stabilizing agents in the resins, and many of the most effective of these, being compounds of lead, may engender an undesirable degree of toxicity under some circumstances. In addition, the temperatures required are beyond the normal range of many industrial ovens now in use. Furthermore, there are many instances where a resistant coating is required, particularly on large objects already fabricated, such as on the interior of tank cars or on metal surfaces exteriorly exposed, in which a baked coating is precluded by the location or size of the object coated.

To remedy the above defect, various expedients have been attempted without notable improvement in the adhesion secured. These include the use of different primer coatings, the incorporation of gums and other resins with the conjointly polymerized resins, and various means of pretreating the surface to be coated.

It has now been found that the lack of suitable adhesiveness of such resins may be obviated by appropriate chemical modification of the resin during polymerization of the substances from which it is formed. This comprises conjointly polymerizing the vinyl halide and the aliphatic vinyl ester with small quantities of an alpha, beta-olefinic unsaturated carboxylic acid. Compounds of this type, as represented by maleic acid, maleic anhydride, monoesters of maleic and fumaric acid, benzyl maleic acid, citraconic acid, itaconic acid, phenyl maleic acid, chloro-maleic acid, crotonic acid, acrylic acid and methacrylic acid, are capable of conjoint polymerization with the vinyl halide and the vinyl aliphatic ester to form a three component polymer. This modified conjoint polymer, as compared to a conjoint polymer which contains no conjointly polymerized acid, exhibits remarkably improved adhesion to smooth surfaces, such as those of glass and metal. Tests have shown that the improved adhesive properties of the modified conjoint polymer may be attributed to the presence of the unreacted carboxyl groups of the conjointly polymerized alpha, beta-olefinic unsaturated acid. For instance, it has been established that washing the modified resin with an alkaline solution will destroy the improved adhesive properties. Also, it has been found that the conjoint polymerization of compounds which do not contain free carboxyl groups, such as dimethyl maleate, with a vinyl halide and a vinyl aliphatic ester, does not result in a resin having improved adhesive qualities.

The improved adhesion of the acid modified vinyl resins makes them a desirable resinous ingredient of coating compositions. Thus, if a lacquer composed of a solution of such a resin is applied to a smooth surface and allowed to dry at ordinary temperatures, the adhesion of the resultant film is excellent. If a baked finish is required, normal baking temperatures of about 250° F. may be used without recourse to the higher temperatures ordinarily required to obtain good adhesion and, as a consequence, stabilizing agents required for protection against decomposition in high temperature baking either are not necessary, or if required, need be present only in very much smaller proportions.

The above aliphatic, alpha, beta-mono-olefinic carboxylic acids differ somewhat in the degree of adhesiveness which they impart to the conjoint polymer and in the ease with which they enter into the polymerization reaction. Some of them, such as maleic anhydride and derivatives of fumaric acid, appear to inhibit the polymerization for a relatively long period and to decrease somewhat the yield of resin obtained. Others, such as maleic acid, affect the polymerization only slightly. In addition to its lack of inhibitive influence, maleic acid is preferred as a modifying ingredient because the improvement it induces in the adhesive qualities of the resin is as least as marked as that of any other alpha, beta-unsaturated olefinic carboxylic acid.

As stated before, this invention contemplates the use of small quantities of the modifying compounds. It has been found that the combination of as little as 0.1% by weight of one of these compounds with the conjointly polymerized vinyl resin causes a detectable improvement in its adhesive qualities. Continued improvement in the adhesion of the resin coating is obtained as the quantity of the modifying compounds is increased to about 1% to 4% by weight of the resin, after which, additional amounts do not produce any improvement in this property. On the contrary, the use of quantities of the modifying compounds larger than about 4% by weight not only impairs definitely other valuable characteristics of the resin, but also may damage the adhesive quality itself. For instance, as the quantity of the modifying compound is increased beyond this range, the resistance of the resin to the action of chemicals, water and the atmospheric elements is markedly decreased and the ability of the resin to withstand the deterioration caused by light and heat is drastically reduced. In addition, larger amounts of these ingredients cause a tendency for solutions of the resin to "cobweb," or coagulate in filaments, on spraying, promote corrosive attack on containers by solutions of the resins, and may cause the resin to react chemically with certain pigments to form insoluble agglomerates in the solutions.

While the detrimental effects caused by large amounts of the modifying compounds will vary with the specific substance used, it may be said that a resin containing more than about 10% by weight of these materials would have very little commercial value as a coating material if used as the sole resinous constituent in the protective film. The optimum amount of the modifying ingredient will vary for each compound and it is, for maleic acid, from about 0.3% to about 3% by weight of the resin. Prolonged exposure tests on films derived from a conjoint polymer of vinyl chloride with vinyl acetate containing 81.3% by weight of combined vinyl chloride and 0.3% by weight of combined maleic acid show that this modified resin of low acid content has as good, if not better, resistance to the deteriorating action of the elements, humid atmospheres, and liquid aliphatic hydrocarbons than the corresponding unmodified resins. Thus, the improved protection afforded because of the superior adhesion of this coating more than offsets any slight detrimental effect resulting from the combined maleic acid content.

It has also been found that the modified resins may be blended with the unmodified copolymer resins to form protective coating compositions with satisfactory adhesion. It is characteristic of such a blend that the unmodified resin tends to mitigate any detrimental properties of the modified resin caused by the presence of large quantities of the modifying ingredients. However, it is still essential that the total amount of modifying substance present, based on both modified and unmodified resin, does not exceed about 10% by weight of the total blend.

The modified resin may also be applied as a primer coating to the surface to be protected and the subsequent coatings may consist of the unmodified conjoint polymer, the modified resin, or a mixture of the two. In either case, adequate adhesion of the film is obtained upon air-drying. If a baked coating is desired, a primer coating of the modified resin may be deposited by spraying and the succeeding coats may consist of the unmodified conjoint polymer, the modified resin, or a combination of the two. In such applications, the baking may be carried out at relatively low temperatures varying from 225° to 300° F., whereas the unmodified resin must be baked at temperatures ranging from 350° to 375° F. to obtain good bonding strength. This is a distinct advantage since many industrial ovens are not designed to operate at the higher baking temperatures, particularly those used in finishing metal cabinets and in coating hard rubber and glass. Of even greater importance, however, is the fact that toxic lead stabilizers are not required in baking at the lower temperatures and that non-poisonous pigments of high covering power, such as titanium dioxide, may be used exclusively in the coating.

A further characteristic of this invention is that the modified vinyl resin may serve as an adherent primer coating for subsequent films of other resinous materials which otherwise would not exert effective adhesion to the surface to be protected. For instance, it has been found that the adhesion of a film of a methyl methacrylate polymer is greatly improved if applied over a primer coating of a modified vinyl resin. For instance, a finish of this character exhibits outstanding and superior resistance to the action of a 70% by weight solution of caustic soda at 100° C., whereas a film of the methyl methacrylate polymer alone, without the primer coating, is easily attached and loosened under these conditions. Other resins of high chemical resistance, films of which have been successfully applied over a modified vinyl resin primer, include high polymerized polyvinyl chloride and a conjoint polymer of vinyl chloride with vinyl acetate containing about 95% by weight combined vinyl chloride in the polymer.

The modified resins with which this invention is concerned are those formed, in the presence of small quantities of the alpha, beta-olefinic unsaturated acids, by the conjoint polymerization of vinyl halides, such as vinyl chloride and vinyl bromide, with vinyl esters of aliphatic acids, such as the vinyl esters of formic, acetic, propionic, and butyric acids. Particularly desirable are those resins formed from vinyl chloride and vinyl acetate which, in addition to having from about 0.1% to 10% by weight of the modifying compound, have from about 60% to about 95% by weight combined vinyl chloride in the polymer and have an average macromolecular weight of from about 6,000 to 25,000. Preferred resins within this group are those which have from about 0.3% to about 3% by weight of the modifying ingredient, a combined vinyl chloride content of from 80% to 90% by weight, and an average macromolecular weight of from 8,000 to 12,000. (Molecular weights referred to herein are those determined by means of Staudinger's formula from the specific viscosity of a dilute solution of the resin.)

Of the examples to follow, the first will illustrate the conjoint polymerization of vinyl chloride and vinyl acetate in the presence of the modifying substances of this invention and those succeeding will discuss the various properties and uses of such a modified resin.

*Example 1*

Modified conjoint polymers containing by weight about 86% vinyl chloride, about 2% of modifying compound, and the remainder vinyl acetate were made by charging about 80 parts by weight of vinyl chloride, about 20 parts of vinyl acetate, about 0.5 part of a modifying compound, 50 parts of acetone, and a small amount of diacetyl peroxide catalyst to a lead-lined autoclave. The temperature was raised to 40° C., and, after an induction period of several hours, polymerization took place. The details of the runs are shown in tabular form below; the inhibiting effect of maleic anhydride upon the reaction rate being noteworthy as well as the fact that maleic acid enters the polymeric macromolecule at a faster rate than the other vinyl compounds, as shown by the greater content of maleic acid in the polymerized resin than in the monomeric ingredients charged.

|  | Run No.— | | |
| --- | --- | --- | --- |
|  | 1 | 2 | 3 |
| Modifying compound | Maleic acid | Maleic acid | Maleic anhydride |
| Modifying compound in charge...percent by weight.. | 0.5 | 0.5 | 0.45 |
| Induction period...hours.. | 10 | 15 | 60 |
| Total reaction time...do.... | 103 | 85 | 121 |
| Yield of resin...percent.. | 22 | 29 | 5 |
| Average macromolecular weight of resin | 12,000 | 10,200 | 10,300 |
| Modifying compound in resin...percent by weight.. | 1.7 | 1.9 |  |

*Example 2*

This example illustrates the effect of varying amounts of maleic acid on the air-drying adhesion of films of several modified resins deposited on steel test panels from their solutions. The salient facts are set forth in tabular form below.

| Test No.— | Weight percentage of maleic acid | Weight percentage of vinyl chloride | Average macromolecular weight | Air-drying adherence of film to steel |
| --- | --- | --- | --- | --- |
| 1 | None | 86 to 88 | 8,000 to 10,000 | Poor. |
| 2 | 0.1 | 85.5 | 10,100 | Slight. |
| 3 | 0.3 | 81.3 | 10,200 | Good. |
| 4 | 0.7 | 76.3 | 8,600 | Do. |
| 5 | 1.7 | 82.5 | 7,600 | Do. |
| 6 | 7.3 | 80.5 | 9,700 | Do. |
| 7 | 9.1 | 86.4 | 7,000 | Do. |
| 8 | 10.6 | 76.7 | 8,720 | Do. |

As has been stated before, the use of larger amounts of the modifying compound effects no increased improvements in the adhesive qualities of the resin and increasingly detracts from its qualities in other respects. For instance, the resin described in Test No. 3 above, containing 0.3% maleic acid, did not darken on four days exposure at 150° F., whereas the resin described in Test No. 7, containing 9.1% maleic acid, showed marked yellowing under the same conditions.

*Example 3*

When the amount of the modifying compound is very small, a dibasic acid appears more effective in increasing the adhesion of the modified resin than a monobasic acid, for the same amount of the conjointly polymerized alpha, beta-unsaturated carboxylic acid. Thus, a film of a conjoint polymer of vinyl chloride with vinyl acetate containing 76.8% vinyl chloride and 0.5% of combined maleic anhydride and having a macromolecular weight of 6,300 had better adhesion to steel on air-drying, than did a conjoint polymer containing 87.4% vinyl chloride and 0.6% crotonic acid, having a marcromolecular weight of 11,000. However, both resins, as compared to an unmodified conjoint polymer, had improved adhesive properties.

*Example 4*

When the amount of monobasic acid employed as a modifying agent is somewhat greater, modified resins equivalent in adherence to those modified with dibasic acids may be formed. Thus a conjoint polymer resin containing 1% methacrylic acid, 84% vinyl chloride and 15% vinyl acetate and having an average macromolecular weight of about 12,000, exhibited about the same improvement in adhesive qualities as do the resins containing small amounts of maleic acid. In determining this, a 20% solution of the modified resin in a mixture of equal parts of methyl isobutyl ketone and toluene was prepared and poured over clean panels of steel, copper and glass. The panels were placed in a vertical position, whereby the excess solution drained off, and they were then permitted to dry in contact with the air for two days. It was found that the film adhered tenaciously to all three panels. On the other hand, films deposited from solutions of an unmodified conjoint polymer of vinyl chloride with vinyl acetate on similar panels, and air dried, could be readily stripped from the panels.

*Example 5*

This example demonstrates the preparation of a baked orange-colored finish essentially composed of a modified resin.

A pigment dispersion was prepared by grinding the following composition on a differential two-roll mill for about 10 minutes at a temperature varying from 30° to 60° C.

| | Per cent by weight |
| --- | --- |
| Lead chromate | 79.0 |
| Unmodified conjoint polymer [1] | 15.0 |
| Di (beta-butoxyethyl) phthalate | 5.0 |
| Blown castor oil | 1.0 |
| | 100.00 |

[1] Vinyl chloride 86 to 88%, average macromolecular weight 9,000 to 10,000.

This "stock" was dispersed in a solvent-diluent mixture in the following proportions by weight to form a pigment paste:

| | Parts |
| --- | --- |
| Stock | 2 |
| Toluene | 0.5 |
| Methyl isobutyl ketone | 0.5 |

This pigment paste was incorporated with a modified resin containing by weight 0.5% maleic acid, 84.7% vinyl chloride, and 14.8% vinyl acetate and having an average macromolecular weight of 8,400. A lacquer of the following composition was then formed:

| | Per cent by weight |
|---|---|
| Lead chromate | 10.5 |
| Unmodified conjoint polymer | 2.0 |
| Modified resin | 13.0 |
| Toluene | 36.2 |
| Methyl isobutyl ketone | 36.2 |
| Di (beta-butoxyethyl) phthalate | 2.0 |
| Blown castor oil | 0.1 |
| | 100.00 |

This lacquer was diluted with additional solvent-diluent mixture of the composition indicated above, so that it was of spraying viscosity, which corresponds to a time of efflux of about 16 to 18 seconds when determined by a Ford cup viscosimeter, No. 4 tip, at 80° F. Two coats of the diluted lacquer were sprayed over a steel panel. On baking for 30 minutes at 250° F. there was produced a tough and very adherent film with good resistance to water and chemicals.

Example 6

A white pigment dispersion of the following composition was prepared according to the procedure described in Example 5:

| | Per cent by weight |
|---|---|
| Titanium dioxide | 68.5 |
| Antimony oxide | 7.5 |
| Unmodified conjoint polymer [1] | 15.0 |
| Di (beta-butoxyethyl) phthalate | 8.0 |
| Blown castor oil | 1.0 |
| | 100.00 |

[1] Composition identical with that of Example 5.

This dispersion was made into a pigment paste by adding one-half part of toluene and one-half part of methyl isobutyl ketone to two parts of the dispersion. The pigment paste was combined with additional solvent-diluent mixture and with the modified resin described in Example 5 to form a spraying lacquer of the following composition:

| | Per cent by weight |
|---|---|
| Titanium dioxide | 13.7 |
| Antimony oxide | 1.5 |
| Unmodified conjoint polymer | 3.0 |
| Modified resin | 12.0 |
| Methyl isobutyl ketone | 33.0 |
| Toluene | 33.0 |
| Di (beta-butoxyethyl) phthalate | 3.6 |
| Blown castor oil | 0.2 |
| | 100.00 |

This lacquer was sprayed over a steel test panel and a second coat of a lacquer similarly compounded but containing only unmodified conjoint polymer was applied in the same manner. On baking the two coats for about 45 minutes at 225° F., there resulted a hard, adherent, white enamel having excellent covering power, good durability, and low toxicity characteristics.

Example 7

Modified resin compositions were prepared identical with those described in Examples 5 and 6 with the exception that a modified resin containing by weight 82.5% vinyl chloride, 15.8% vinyl acetate, 1.7% maleic acid, having an average macromolecular weight of 7,600, was used. One coat of the chrome orange lacquer was applied to a steel test panel followed by two coats of the white lacquer, and the entire system air-dried for several hours. The resultant coating was tough and adherent and is especially suited for a decorative protective finish for interior use, since its rather high ratio of pigment to resin may cause it to chalk on exterior applications.

Where a coating highly resistant to chemicals and to water for exterior exposure is required, one or more coats of a clear (unpigmented) lacquer containing the unmodified conjoint polymer may be applied over a primer deposited from a lacquer prepared as described in Example 5 or 6. Such a finish has excellent adherence on air-drying and shows little tendency to deteriorate by chalking. It is admirably adapted for use as a protective coating for equipment in chemical plants and dairies and for lining storage tanks and tank cars.

Example 8

This example illustrates a finish which will withstand the action of the atmospheric elements for prolonged periods without appreciable deterioration and which has superior resistance to moisture and to chemicals.

In the preparation of this finish, a primer coating was deposited from the lacquer described in Example 5, good adhesion being secured on air drying. Over the primer there was applied a film derived from a lacquer of the composition given below. Upon evaporation of the solvents, strong bonds between the primer and the subsequent coats were obtained to yield a hard, adherent, and chemically resistant finish. The composition of the lacquer applied over the primer was as follows:

| | Per cent by weight |
|---|---|
| Lead titanate | 10.0 |
| Carbon black | 1.0 |
| Unmodified conjoint polymer | 16.0 |
| Di(beta-butoxyethyl) phthalate | 3.0 |
| Methyl isobutyl ketone | 35.0 |
| Toluene | 35.0 |
| | 100.00 |

Example 9

This example illustrates a protective coating material made of a blend of an unmodified conjoint polymer with a modified resin of high maleic acid content. To prepare such a blend, the resinous ingredients were dispersed in a solvent-diluent mixture to form a clear lacquer of the following composition:

| | Parts by weight |
|---|---|
| Modified resin [1] | 2 |
| Unmodified conjoint polymer | 18 |
| Methyl isobutyl ketone | 40 |
| Toluene | 40 |
| Di(beta-butoxyethyl) phthalate | 3 |

[1] Vinyl chloride 86.4%, vinyl acetate 4.5%, maleic acid 9.1%, all by weight, average macromolecular weight 7,000.

After dilution to spraying viscosity, one coat of this lacquer was applied as a primer to a steel test panel followed by several coats of a pigmented lacquer containing only unmodified resin. On air-drying, there resulted an adherent finish despite the large amount of unmodified resin in the primer coating. It was well adapted as a protective finish for maintenance applications by reason of its resistance to water and its chemical inertness.

Example 10

Twenty parts of a modified resin containing by weight 76.8% vinyl chloride, 0.5% maleic anhydride and the remainder vinyl acetate, having an average macromolecular weight of 6,300, were dissolved in a mixture of 40 parts of methyl isobutyl ketone, 40 parts of toluene, and 3 parts of di(beta-butoxyethyl) phthalate. Upon dilution with about 56 parts of the solvent-diluent mixture, the lacquer was applied to a steel test panel as a primer by spraying. Additional coats of a clear, plasticized lacquer containing unmodified resin only were applied and the entire finish air-dried. This coating is adapted to protect from corrosive attack such surfaces as steel, black iron, stainless steel, wood, and hard rubber. For instance, the finish may be used to protect hard rubber storage battery boxes from attack by sulfuric acid.

Example 11

Twenty parts of modified conjoint polymer resin of vinyl chloride with vinyl acetate and containing 1.2% mono-2-ethylhexyl maleate and having an average macromolecular weight of 10,200 were dissolved in a mixture of 40 parts of toluene, 40 parts of methyl isobutyl ketone and 3 parts of di(beta-butoxyethyl) phthalate. After diluting with about 56 parts of the solvent-diluent mixture, several coats of the lacquer were sprayed over steel, glass, and hard rubber surfaces to give adherent, protective, and transparent coatings.

Example 12

In the manner described in the foregoing example, there was compounded and applied a lacquer made from a modified conjoint polymer of vinyl chloride with vinyl acetate containing 3.0% mono-ethyl fumarate.

Example 13

This example describes a protective coating comprising a primer coating composed of a modified conjoint polymer and subsequent layers of another chemically inert resin adhered thereto.

To achieve this, a primer coating of the following composition was prepared:

| | Per cent by weight |
|---|---|
| Modified resin[1] | 12.0 |
| Lead titanate | 15.6 |
| Unmodified conjoint polymer | 3.0 |
| Di (beta-butoxyethyl) phthalate | 1.1 |
| Blown castor oil | 0.3 |
| Methyl isobutyl ketone | 34.0 |
| Toluene | 34.0 |
| | 100.00 |

[1] Vinyl chloride 85.6% by weight, maleic acid 0.6%, and average macro-molecular weight 8,400.

This lacquer was diluted to spraying viscosity and sprayed onto steel panels, the surface of which had been roughened by sand-blasting, and allowed to dry. Two coats of a clear lacquer, of the following composition, were then applied by brushing.

| | Per cent by weight |
|---|---|
| Methyl methacrylate polymer | 20 |
| Toluene | 80 |
| | 100 |

After drying the coated panels, they were immersed in 70% by weight solution of caustic soda at 100° C. for three weeks. During this time no failure whatsoever of the coating was observed, whereas coatings of the methyl methacrylate resin alone, as well as all other finishes tested, showed appreciable deterioration, either by decomposition due to chemical attack, or failure of the coating by peeling, blistering, or rusting.

It is understood that different formulations from those shown in the foregoing examples may be employed. For instance, solvents of less or greater degree of volatility can be used, such as acetone, methyl ethyl ketone, propylene oxide, mesityl oxide, dioxane, cyclohexanone, and isophorone, and the nitroparaffin solvents. Diluents other than toluene include xylene and tetrahydronaphthalene. Examples of other suitable plasticizers are tricresyl phosphate, dibutyl phthalate, diethyl phthalate, and triglycol di(2-ethyl hexoate). If solvents and diluents of higher boiling point are used, application of the composition by roller coating would be satisfactory. The coating composition may be applied to other types of surfaces than those shown in the foregoing examples. Thus, clear lacquers containing the modified resin may be employed either as an air-drying or baked coating for aluminum and other metal foils used in packaging food products. Also a wide variety of pigments, gums, stabilizers, dyes, and other ingredients may be added as is well known in the art of compounding vinyl resins. All such modifications are included within the invention as defined in the appended claims.

This application is a continuation-in-part of the copending application of W. E. Campbell, Jr., Serial No. 306,650, filed November 29, 1939, entitled "Vinyl resins and coating compositions therefrom."

What is claimed is:

1. A coating composition of effective adhesion to smooth surfaces, containing a substantial amount of a conjoint polymer of a vinyl halide, a vinyl ester of a lower saturated fatty acid, and an aliphatic alpha, beta-mono-olefinic carboxylic acid, the amount of carboxylic acid combined in said polymer being between about 0.1% and about 4% by weight of the conjoint polymer and the carboxyl groups in said conjoint polymer being substantially unreacted.

2. A liquid coating composition adapted on air-drying to deposit a film which is adherent to smooth surfaces, comprising a solution in an organic solvent of a conjoint polymer of a vinyl halide, a vinyl ester of a lower saturated fatty acid, and an aliphatic alpha, beta-mono-olefinic carboxylic acid, the amount of carboxylic acid combined in said polymer being between about 0.1% and about 4% by weight of the conjoint polymer and the carboxyl groups in said conjoint polymer being substantially unreacted.

3. A liquid coating composition adapted on baking at temperatures of about 250° F. to deposit a film which is adherent to metal surfaces, comprising a solution in an organic solvent of a conjoint polymer of vinyl chloride, vinyl acetate, and maleic acid, the amount of maleic acid combined in said polymer being between about 0.1% and about 3% by weight of the conjoint palymer and the carboxyl groups in said conjoint polymer being substantially unreacted.

4. A coating composition of effective adhesion to smooth surfaces, containing a substantial amount of a conjoint polymer of vinyl chloride, vinyl acetate, and maleic acid, the amount of maleic acid combined in said polymer being between about 0.1% and about 3% by weight of the conjoint polymer and the carboxyl groups in said conjoint polymer being substantially unreacted.

5. A coating composition of effective adhesion to smooth surfaces, containing a substantial amount of a conjoint polymer of vinyl chloride, vinyl acetate, and an acrylic acid having from three to four carbon atoms, the amount of the acrylic acid combined in said polymer being between about 0.1% and about 3% by weight of the conjoint polymer and the carboxyl groups in said conjoint polymer being substantially unreacted.

6. A coating composition of effective adhesion to smooth surfaces, containing a substantial amount of a conjoint polymer of vinyl chloride, vinyl acetate, and mono-2-ethylhexylmaleate, the amount of the maleate mono-ester combined in said polymer being between about 0.1% and about 4% by weight of the conjoint polymer and the carboxyl groups in said conjoint polymer being substantially unreacted.

7. A coating composition of effective adhesive properties containing a substantial amount of a conjoint polymer of vinyl chloride, a vinyl ester of a lower saturated fatty acid, and an aliphatic alpha, beta-mono-olefinic carboxylic acid, the amount of the carboxylic acid combined in said polymer being between about 0.1% and about 4% by weight of the conjoint polymer and the carboxyl groups in said conjoint polymer being substantially unreacted; said conjoint polymer having an average molecular weight of from about 6000 to about 25,000, and having from about 60% to about 95% by weight of combined vinyl chloride in the polymer.

8. A coating composition of effective adhesive properties containing a substantial amount of a conjoint polymer of vinyl chloride, a vinyl ester of a lower saturated fatty acid, and an aliphatic alpha, beta-mono-olefinic carboxylic acid, the amount of carboxylic acid combined in the polymer being between about 0.1% and about 4% by weight of the conjoint polymer and the carboxyl groups in said conjoint polymer being substantially unreacted; said conjoint polymer having an average molecular weight of from 8000 to 12,000 and having from 80% to 90% by weight of combined vinyl chloride in the polymer.

9. A coating composition of effective adhesive properties containing a substantial amount of a conjoint polymer of vinyl chloride, vinyl acetate and maleic acid, the amount of maleic acid combined in the polymer being about 0.1% and 3.0% by weight of the conjoint polymer and the carboxyl groups in said conjoint polymer being substantially unreacted; said conjoint polymer having an average molecular weight of from 8000 to 12,000 and having from 80% to 90% by weight of combined vinyl chloride in the polymer.

10. A liquid coating composition of effective adhesive properties comprising a solution in an organic solvent of a conjoint polymer of vinyl chloride with vinyl acetate, and of a conjoint polymer of vinyl chloride, vinyl acetate, and an aliphatic alpha, beta-mono-olefinic carboxylic acid, the amount of carboxylic acid combined in said second conjoint polymer not exceeding about 4% by weight of both conjoint polymers, and the carboxyl groups in said second conjoint polymer being substantially unreacted.

11. A liquid coating composition of effective adhesive properties comprising a clear solution in an organic solvent of a conjoint polymer of vinyl chloride with vinyl acetate, and of a conjoint polymer of vinyl chloride, vinyl acetate, and maleic acid, the amount of maleic acid combined in said second conjoint polymer not exceeding about 4% by weight of both conjoint polymers, and the carboxyl groups in said second conjoint polymer being substantially unreacted.

12. A liquid primer coating composition adapted to deposit a film which is adherent to smooth surfaces and to subsequent coatings of resinous materials, comprising a solution in an organic solvent of a plasticizer and a conjoint polymer of vinyl chloride, vinyl acetate, and an aliphatic, alpha, beta-mono-olefinic carboxylic acid, the amount of carboxylic acid combined in said polymer being between about 0.1% and about 4% by weight of the conjoint polymer and the carboxyl groups in said conjoint polymer being substantially unreacted.

13. A liquid primer coating composition adapted to deposit a film which is adherent to smooth surfaces and to subsequent coatings of resinous materials comprising a solution in an organic solvent of a plasticizer and a conjoint polymer of vinyl chloride, vinyl acetate, and maleic acid, the amount of maleic acid combined in said polymer being between about 0.1% and about 3% by weight of the conjoint polymer and the carboxyl groups in said conjoint polymer being substantially unreacted.

WILLIAM E. CAMPBELL, Jr.

CERTIFICATE OF CORRECTION.

Patent No. 2,329,456. September 14, 1943.

WILLIAM E. CAMPBELL, JR.

It is hereby certified that error appears in the printed specification of the above numbered patent requiring correction as follows: Page 2, second column, line 44, for the word "high" read --highly--; page 3, line 36, Example 1, Run 1, for "12,000" read --12,200--; page 5, first column, line 62, Example 13, for "macro-molecular" read --macromolecular--; and that the said Letters Patent should be read with this correction therein that the same may conform to the record of the case in the Patent Office.

Signed and sealed this 2nd day of November, A. D. 1943.

(Seal)
Henry Van Arsdale,
Acting Commissioner of Patents.